US009294178B2

(12) United States Patent
Jung et al.

(10) Patent No.: US 9,294,178 B2
(45) Date of Patent: Mar. 22, 2016

(54) METHOD AND APPARATUS FOR TRANSCEIVING FOR BEAM FORMING IN WIRELESS COMMUNICATION SYSTEM

(71) Applicant: Samsung Electronics Co., Ltd., Gyeonggi-do (KR)

(72) Inventors: Dong-Yun Jung, Gyeonggi-do (KR); Sung-Tae Choi, Gyeonggi-do (KR); Dong-Woo Kang, Gyeonggi-do (KR); Ji-Hoon Kim, Gyeonggi-do (KR); Yi-Ju Roh, Gyeonggi-do (KR); Yun-A Shim, Gangwon-do (KR); Dong-Hyun Lee, Gyeonggi-do (KR); Seung-Pyo Hong, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/590,761

(22) Filed: Jan. 6, 2015

(65) Prior Publication Data
US 2015/0195027 A1 Jul. 9, 2015

(30) Foreign Application Priority Data

Jan. 6, 2014 (KR) ........................ 10-2014-0001517

(51) Int. Cl.
*H04B 1/38* (2015.01)
*H04L 5/16* (2006.01)
*H04B 7/06* (2006.01)
*H04B 7/08* (2006.01)
*H04B 1/30* (2006.01)
*H04B 1/52* (2015.01)

(52) U.S. Cl.
CPC ................ *H04B 7/0617* (2013.01); *H04B 1/30* (2013.01); *H04B 1/52* (2013.01); *H04B 7/086* (2013.01)

(58) Field of Classification Search
CPC .. H04B 7/0617; H04B 7/0608; H04B 7/0404; H04B 7/0408; H04B 7/043; H04B 7/0691; H04B 7/0695; H04B 7/0874; H04B 7/088; H04B 7/0897; H04B 7/086; H04B 1/30; H04B 1/52; H04L 27/20; H04L 1/06
USPC .................................................. 375/219, 222
See application file for complete search history.

(56) References Cited

U.S. PATENT DOCUMENTS 4,696,017 A    9/1987   Masheff et al.
7,492,313 B1 *  2/2009   Ehret et al. .................... 342/175

(Continued)

FOREIGN PATENT DOCUMENTS

KR    10-2011-0057630    6/2011

*Primary Examiner* — Phuong Phu

(57) ABSTRACT

An electronic device for beamforming and a method thereof in a wireless communication system are provided. The electronic device includes a plurality of antennas. The electronic device also includes a plurality of transmitter and receiver switches connected to the antennas and configured to select a plurality of transmission paths and a plurality of reception paths. The electronic device further includes a plurality of first Phase Shifters (P/Ss) configured to shift a phase of Radio Frequency (RF) signals received via the antennas and the transmitter and receiver switches. The electronic device includes a combiner configured to combine the phase-shifted RF signals to one RF signal. The electronic device also includes a quadrature signal generator configured to generate a quadrature signal. The electronic device further includes a down-mixer configured to convert the quadrature signal and the combined RF signal to a first baseband signal and configured to output the first baseband signal to a modem. The electronic device includes a controller configured to control the transmitter and receiver switches, the first P/Ss, and a plurality of second P/Ss to determine a transmission or reception mode of the transmitter and receiver switches, and the phase of the RF signals transmitted and received.

21 Claims, 15 Drawing Sheets

(56) References Cited

U.S. PATENT DOCUMENTS

| | | |
|---|---|---|
| 2004/0204109 A1 | 10/2004 | Hoppenstein |
| 2005/0070333 A1* | 3/2005 | Doi .......................... 455/562.1 |
| 2006/0033671 A1 | 2/2006 | Chan et al. |
| 2007/0105504 A1* | 5/2007 | Vorenkamp et al. ............ 455/73 |
| 2008/0268797 A1* | 10/2008 | Ahn et al. .................. 455/127.1 |
| 2009/0061795 A1 | 3/2009 | Doan et al. |

\* cited by examiner

METHOD AND APPARATUS FOR TRANSCEIVING FOR BEAM FORMING IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 6, 2014, and assigned Serial No. 10-2014-0001517, the entire disclosure of which is hereby incorporated by reference.

TECHNICAL FIELD

The present disclosure relates generally to a method and an apparatus for beamforming in wireless communication using a millimeter band.

BACKGROUND

In a millimeter frequency band, communications are interrupted by an obstacle due to linear propagation. Accordingly, beamforming is required to maintain a Light-of-Sight (LOS) environment and to accomplish smooth communication even in a non-LOS environment.

A transceiver for the beamforming typically employs a heterodyne structure, and includes a Radio Frequency (RF) stage, a Local Oscillator (LO) stage, and an Intermediate Frequency (IF) stage. The transceiver is divided into a transmitter and a receiver, and its antenna is also divided into a transmitting antenna and a receiving antenna.

However, such a structure increases a chip size and power consumption by the number of blocks of the IF stage.

Since the transmitter and the receiver are separated, the LO stage requires the transmitter and the receiver respectively, thus increasing the chip size and the power consumption. Further, since the transmitting antenna and the receiving antenna are separated, a certain number of antennas are required for the transmission and the reception and thus an RF packet size increases.

SUMMARY

To address the above-discussed deficiencies of the prior art, it is a primary aspect of the present invention to provide transceiving method and apparatus for beamforming in a wireless communication system.

Another aspect of the present invention is to provide a method and an apparatus for reducing a chip size and power consumption by minimizing the number of blocks of an RF transceiver using a direct conversion structure which does not use an IF stage for beamforming, and reducing a package size by use of a switch for selecting a transmitter and a receiver to employ antennas and RF chains in the same number, in a wireless communication system.

Yet another aspect of the present invention is to provide a method and an apparatus for minimizing hardware complexity by combining a transmitter and a receiver for beamforming in a wireless communication system.

According to one aspect of the present invention, an electronic device for beamforming in a wireless communication system is provided. The electronic device includes a plurality of antennas. The electronic device also includes a plurality of transmitter and receiver switches connected to the antennas and configured to select a plurality of transmission paths and a plurality of reception paths. The electronic device further includes a plurality of first Phase Shifters (P/Ss) configured to shift a phase of Radio Frequency (RF) signals received via the antennas and the transmitter and receiver switches; a combiner for combining the phase-shifted RF signals to one RF signal. The electronic device includes a quadrature signal generator configured to generate a quadrature signal. The electronic device also includes a down-mixer configured to convert the quadrature signal and the combined RF signal to a first baseband signal and configured to output the first baseband signal to a modem. The electronic device further includes a controller configured to control the transmitter and receiver switches, the first P/Ss, and a plurality of second P/Ss to determine a transmission or reception mode of the transmitter and receiver switches, and the phase of the RF signals transmitted and received.

According to another aspect of the present invention, an operating method of an electronic device for beamforming in a wireless communication system is provided. The method includes receiving a plurality of Radio Frequency (RF) signals from a plurality of antennas; selecting, at a plurality of transmitter and receiver switches, a plurality of reception paths for the received RF signals. The method also includes low-noise amplifying, at least one Low Noise Amplifier (LNA) and the received RF signals. The method further includes shifting, at first Phase Shifters (P/Ss), a phase of the RF signals low-noise amplified. The method includes combining, at a combiner, the phase-shifted RF signals. The method also includes generating, a quadrature signal generator, a quadrature signal. The method further includes down-mixing, at a down mixer, the combined RF signals and the quadrature signal to a first baseband signal and outputting the first baseband signal to a modem.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, occur in amounts that do not preclude the effect the characteristic was intended to provide.

Exemplary embodiments of the present disclosure provide transceiving method and apparatus for beamforming in a wireless communication system.

The present disclosure provides a technique for wirelessly communicating mass data over several gigabit per second (Gbps) using a millimeter band. In the millimeter band, communications are interrupted by an obstacle due to linear propagation. Accordingly, beamforming is required to maintain a Light-of-Sight (LOS) environment and to accomplish smooth communication in a non-LOS environment. In this regard, the present disclosure provides a method and an apparatus for beamforming with low hardware complexity.

Figure 1:
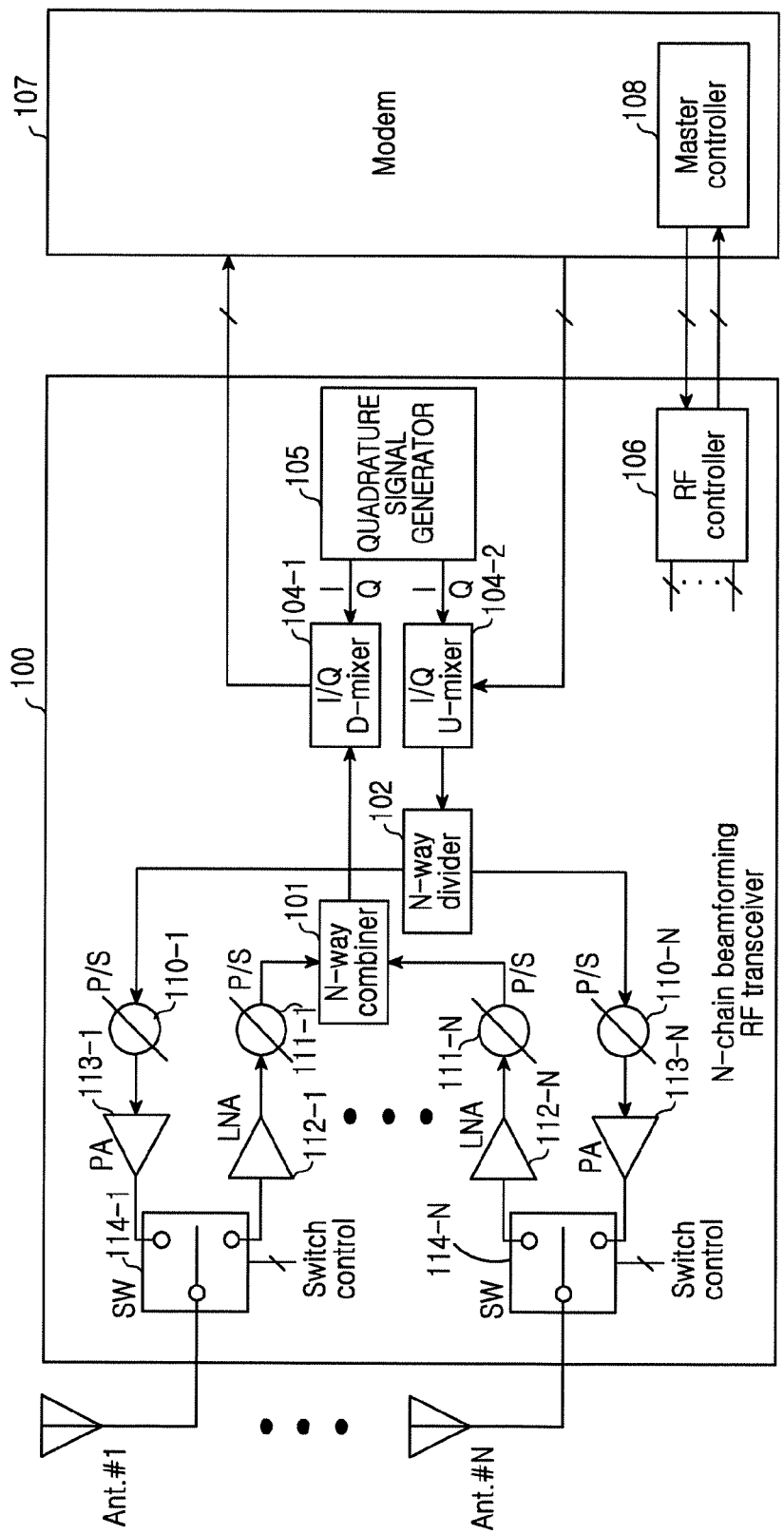
FIGS. 1, 2, 3, 4, 5, 6, 7 and 8 illustrate example RF transceivers according to this disclosure.

FIG. 1 depicts an example Radio Frequency (RF) transceiver according to this disclosure. Referring to FIG. 1, an RF beamforming transceiver 100 employs a direct conversion structure which converts an RF signal directly to a baseband signal, or converts a baseband signal directly to an RF signal using a single frequency converter. Herein, the direct conversion is performed by an I/Q D-mixer 104-1 and an I/Q U-mixer 104-2. The RF beamforming transceiver 100 drives a transmitter and a receiver using a Quadrature Signal Generator (QSG) 105 including a frequency synthesizer.

The RF beamforming transceiver 100 is a multi-chain RF beamforming transceiver which combines or divides multi-chain RF signals using an N-way combiner 101 and an N-way divider 102, and uses Phase Shifters (P/Ss) 110-1 through 110-N and 111-1 through 111-N. The RF beamforming transceiver 100 functions as follows. A baseband signal output from a modem 107 is up-mixed with a quadrature local signal of the QSG 105 in the I/Q U-mixer 104-2 and converted to an RF signal. The converted RF signal is divided into N-ary RF signals in the N-way divider 102.

Next, the RF signals are radiated into the air via the P/Ss 110-1 through 110-N, Power Amplifiers (PAs) 113-1 through 113-N, switches 114-1 through 114-N for selecting the transmitter and the receiver, and antennas. The RF beamforming receiver operates as follows. The RF signals received via antennas are combined to one signal through the N-way combiner 101 via the switches 114-1 through 114-N for selecting the transmitter and the receiver, Low Noise Amplifiers (LNAs) 112-1 through 112-N, and the P/Ss 111-1 through 111-N. The combined signal is down-mixed with an output signal of the QSG 105 in the UQ D-mixer 104-1, converted to the baseband signal, and fed to the modem 107. Herein, the N-way combiner 101 and the N-way divider 102 is implemented in various fashions. For example, to combine 16 RF signals to one RF signal, 16 chains include eight 2-way combiners, two 4-way combiners, and one 2-way combiners, or include four 4-way combiners and one 4-way combiner.

For example, 16 chains include two 8-way combiners and one 2-way combiner, or include one 16-way combiner. Like the N-way combiner, the N-way divider is implemented in various structures. The QSG 105 is a circuit for generating a quadrature signal of a LO frequency $f_{LO}$ and is implemented in various fashions. For example, the QSG 105 includes a synthesizer for generating a signal at the frequency $f_{LO}/M$, an M-fold frequency multiplier, and a 90-degree P/S, or includes a synthesizer for generating a signal at a frequency ($M*f_{LO}$), an M-fold frequency divider, and a 90-degree P/S. For example, the QSG 105 includes a synthesizer with a Quadrature Voltage Controlled Oscillator (QVCO).

The switches 114-1 through 114-N for selecting the transmitter and the receiver is omitted when there is no packet size issue with the small number of RF chains, or is divided to N-ary transmitting antennas and N-ary receiving antennas. The switches 114-1 through 114-N for selecting the transmitter and the receiver set a transmission mode or a reception mode of the beamforming RF transceiver 100 under control of an RF controller 106. The switches 114-1 through 114-N for selecting the transmitter and the receiver select a plurality of transmitters and a plurality of receivers under the control of the RF controller 106.

When a single P/S is use in both of a transmission path and a reception path, the N-way combiner and the N-way divider employ an N-way bidirectional circuit which allows bidirectional signal transfer. The RF controller 106 generates a control signal for setting the transmission mode or the reception mode of the switches 114-1 through 114-N for selecting the transmitter and the receiver. The RF controller 106 controls phase shifting and shift level of the transceived signals by sending the control signal to the P/Ss 110-1 through 110-N and 111-1 through 111-N. The RF controller 106 receives from a main controller 108 a signal for controlling the switches 114-1 through 114-N for selecting the transmitter and the receiver and the P/Ss 110-1 through 110-N and 111-1 through 111-N.

The modem 107 converts the baseband band to a bitstream and vice versa according to a physical layer standard of the system. For example, to transmit data, the modem 107 generates complex symbols by encoding and modulating the transmit bitstream. With the receive data, the modem 107 restores the received bitstream by demodulating and decoding the signal fed from the beamforming RF transceiver 100. For example, based on Orthogonal Frequency Division Multiplexing (OFDM), for the data transmission, the modem 107 generates the complex symbols by encoding and modulating the transmit bitstream, maps the complex symbols to subcarriers, and constructs OFDM symbols using Inverse Fast Fourier Transform (IFFT) and Cyclic Prefix (CP) addition. For the data reception, the modem 107 spits the signal fed from the beamforming RF transceiver 100 to the OFDM symbols, restores the signals mapped to the subcarriers using FFT, and restores the received bitstream by demodulating and decoding the signals. As such, the modem 107 and the beamforming RF transceiver 100 transmit and receive the signals. Hence, the modem 107 and the beamforming RF transceiver 100 can be referred to a transmitter, a receiver, a transceiver, or a communication part.

Figure 2:
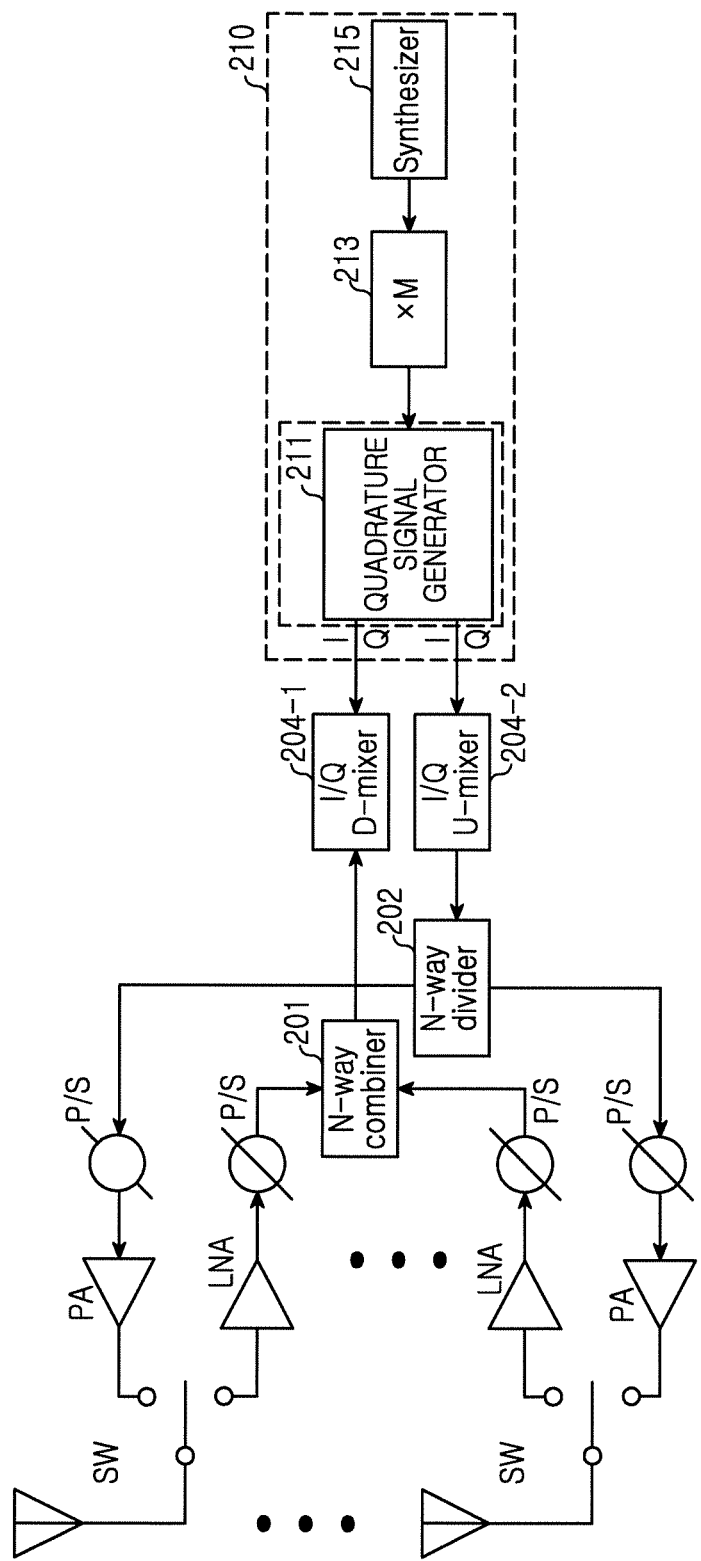

FIG. 2 depicts an example RF transceiver according to this disclosure. Referring to FIG. 2, the QSG 105 of FIG. 1 is shown in detail. That is, the QSG 105 of FIG. 1 includes a synthesizer 215 for generating a local signal at the frequency $f_{LO}/M$, an M-fold frequency multiplier 213, and a QSG 211 for generating a quadrature signal. That is, the block 210 corresponds to the QSG 105 of FIG. 1. In FIG. 2, functions of an N-way combiner 201, an N-way divider 202, an I/Q D-mixer 204-1, an I/Q U-mixer 204-2, and other elements are the same as the functions of FIG. 1.

Figure 3:
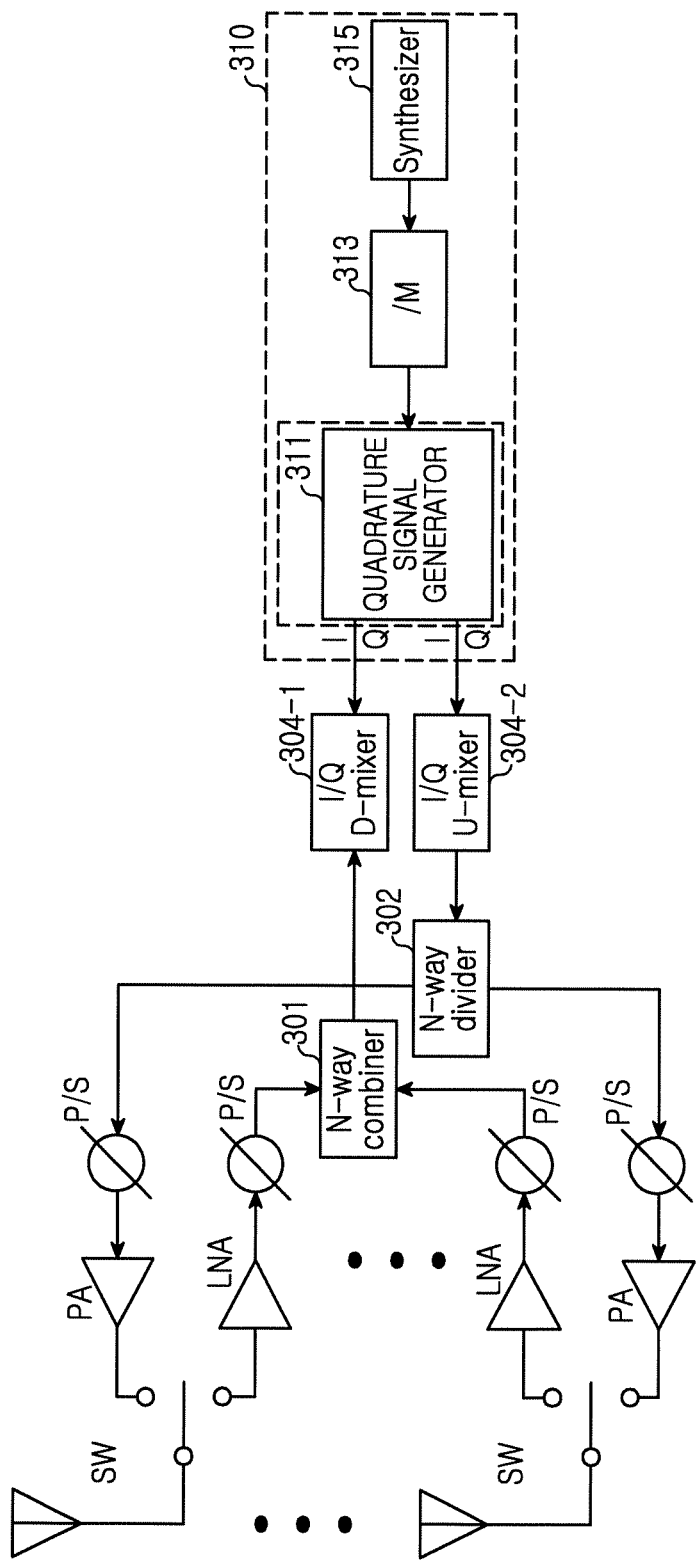

FIG. 3 depicts an example RF transceiver according to this disclosure. Referring to FIG. 3, the QSG 105 of FIG. 1 is shown in detail. That is, the QSG 105 of FIG. 1 includes a synthesizer 315 for generating a local signal at the frequency $(f_{LO}*M)$, an M-fold frequency multiplier 313, and a QSG 311 for generating a quadrature signal. That is, the block 310 corresponds to the QSG 105 of FIG. 1. In FIG. 3, functions of an N-way combiner 301, an N-way divider 302, an I/Q D-mixer 304-1, an I/Q U-mixer 304-2, and other elements are the same as the functions of FIG. 1.

Figure 4:
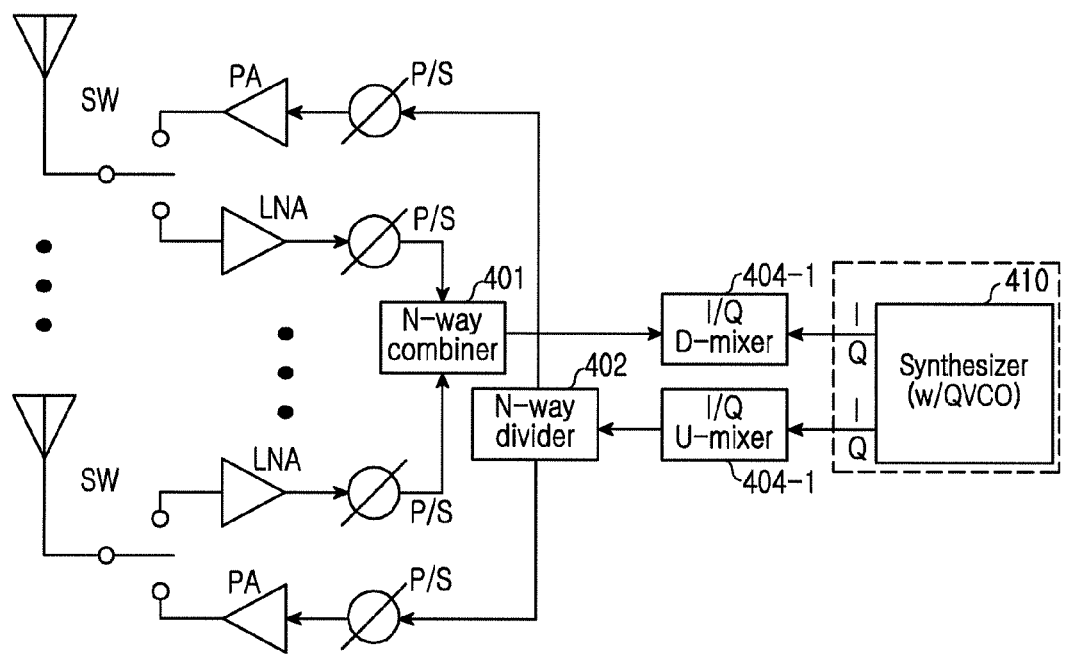

FIG. 4 depicts an example RF transceiver according to this disclosure. Referring to FIG. 4, the QSG 105 of FIG. 1 is shown in detail. That is, the QSG 105 of FIG. 1 is replaced by a synthesizer 410 including a Voltage Controlled Oscillator (VCO) for generating the quadrature signal. In FIG. 4, functions of an N-way combiner 401, an N-way divider 402, an I/Q D-mixer 404-1, an I/Q U-mixer 404-2, and other elements are the same as the functions of FIG. 1.

Figure 5:
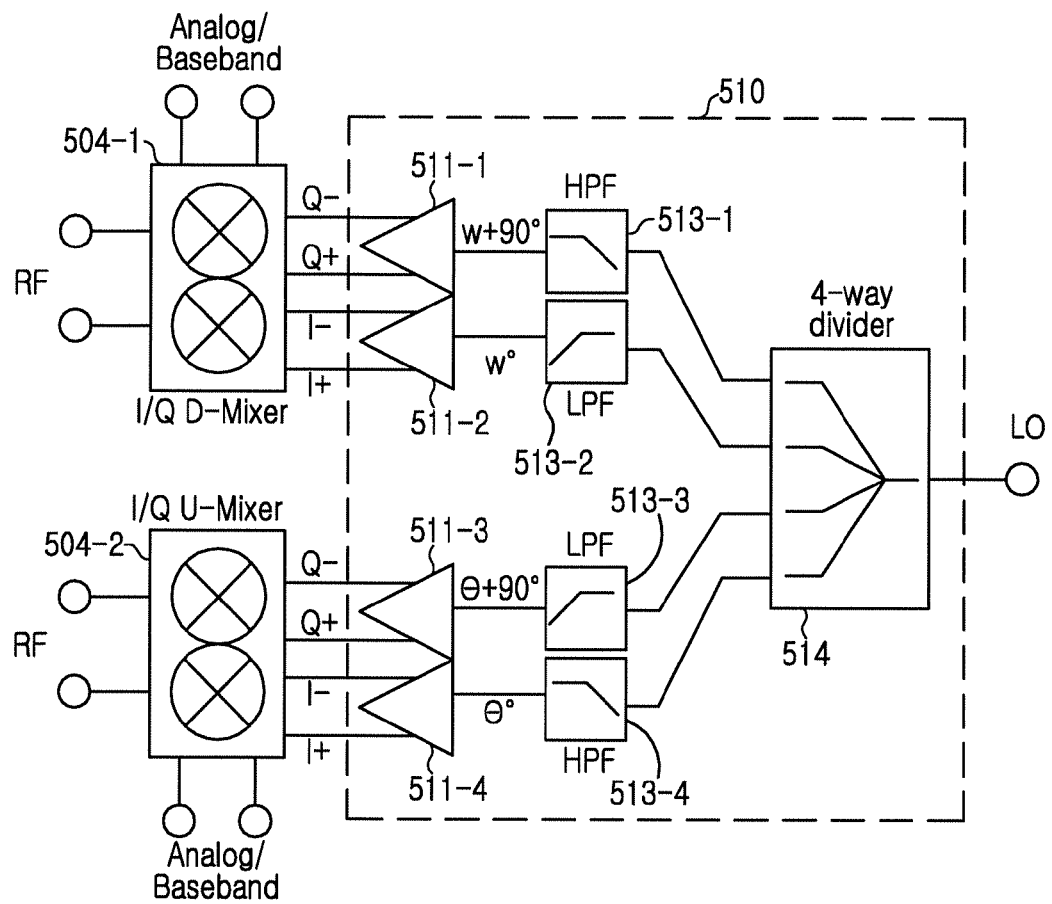

FIG. 5 depicts an example RF transceiver according to this disclosure. Referring to FIG. 5, the QSG 510 includes a 4-way divider 514 for dividing the signal generated at the frequency $f_{LO}$ to four signals, High Pass Filters (HPFs) 513-1 and 513-4 and Low Pass Filters (LPFs) 513-2 and 513-3 for generating a phase difference of 90 degrees at the frequency $f_{LO}$, and amplifiers 511-1 through 511-4 for receiving the single signal from each of the HPFs 513-1 and 513-4 and the LPFs 513-2 and 513-3 and outputting a differential signal. In FIG. 5, functions of an I/Q D-mixer 504-1 and an I/Q U-mixer 504-2 are the same as the functions of FIG. 1.

Figure 6:
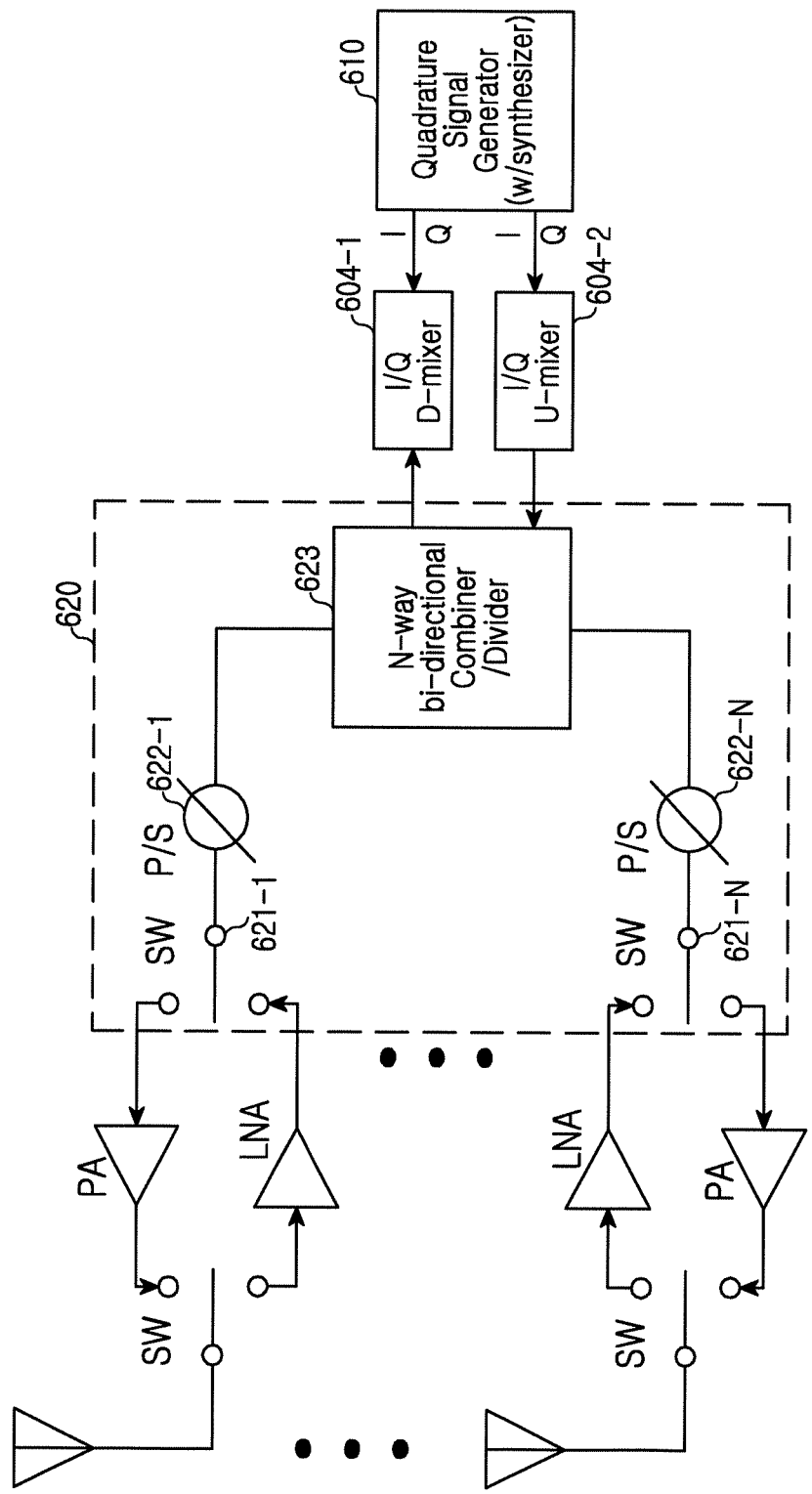

FIG. 6 depicts an example RF transceiver according to this disclosure. Referring to FIG. 6, in a structure 620 for sharing P/Ss 622-1 through 622-N in the transmitter and the receiver, switches 621-1 through 621-N for selecting the transmitter and the receiver are added as many as RF chains. Like the switches 114-1 through 114-N for selecting the transmitter and the receiver of FIG. 1, the switches 621-1 through 621-N for selecting the transmitter and the receiver is controlled by the RF controller 106 of FIG. 1. An N-way divider and an N-way combiner include a single N-way bidirectional combiner/divider 623 allowing the bidirectional signaling. In FIG. 6, functions of an I/Q D-mixer 604-1, an I/Q U-mixer 604-2, the QSG 610, and other elements are the same as the functions of FIG. 1.

Figure 7:
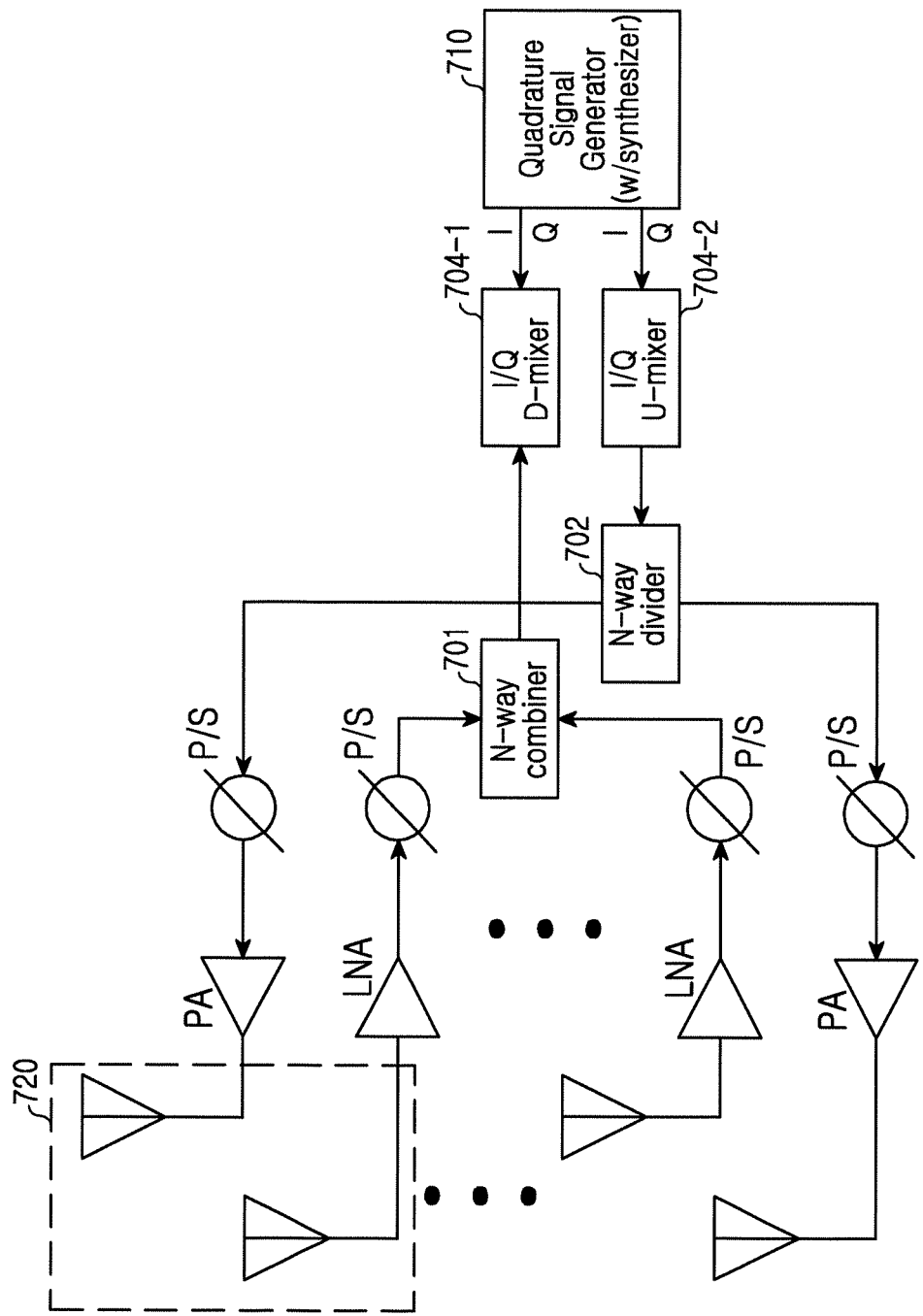

FIG. 7 depicts an example RF transceiver according to this disclosure. Referring to FIG. 7, with a small number of RF chains, a structure 720 uses a transmitting antenna and a receiving antenna individually. In FIG. 7, functions of an N-way combiner 701, an N-way divider 702, an I/Q D-mixer 704-1, an I/Q U-mixer 704-2, a QSG 710, and other elements are the same as the functions of FIG. 1.

Figure 8:
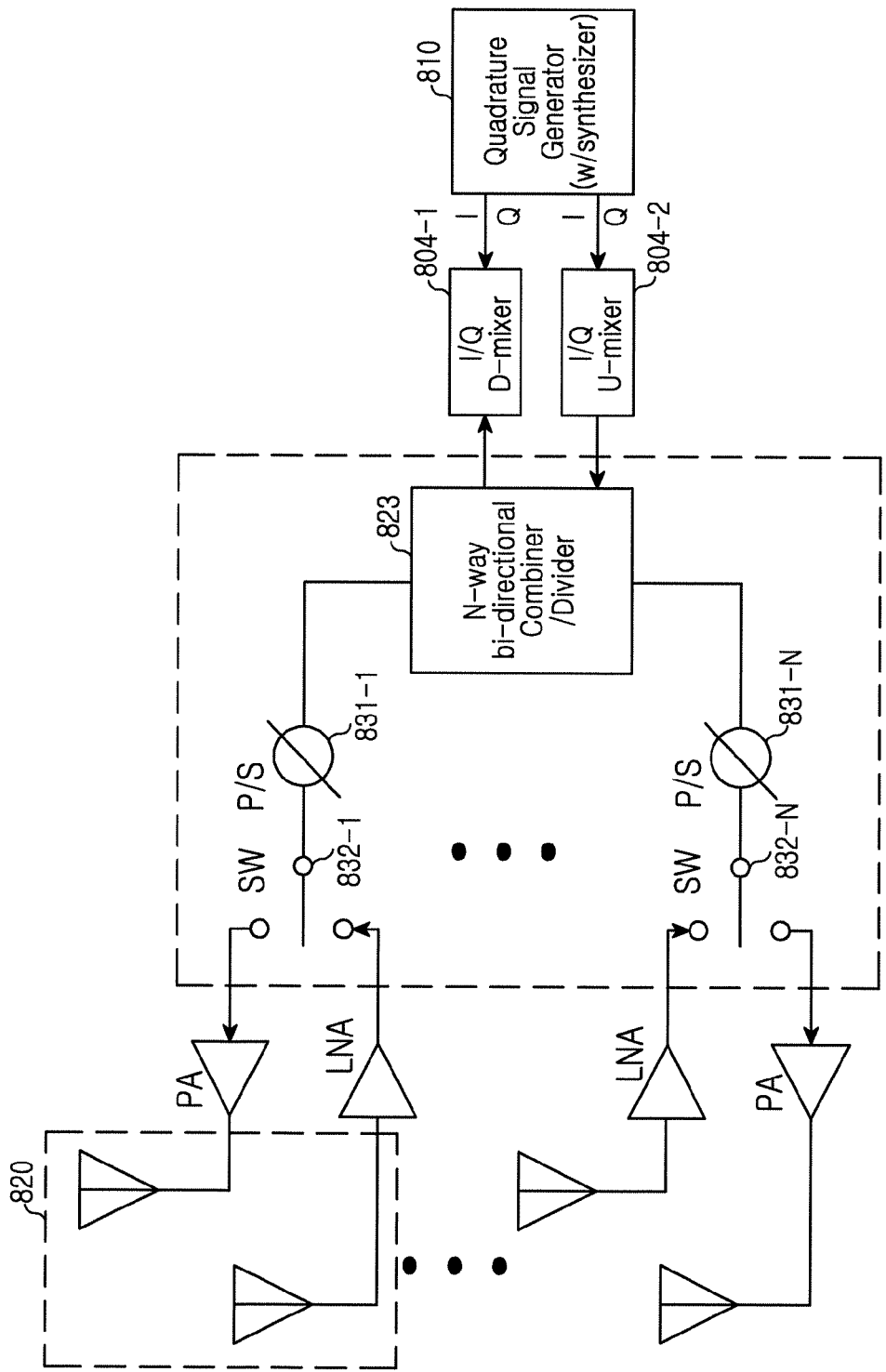

FIG. 8 depicts an example RF transceiver according to this disclosure. Referring to FIG. 8, with a small number of RF chains, a structure 820 uses the transmitting antenna and the receiving antenna individually. P/Ss 831-1 through 831-N is shared by the transmitting antenna and the receiving antenna. Herein, switches 832-1 through 832-N for selecting the transmitter and the receiver are used. The switches 832-1 through 832-N for selecting the transmitter and the receiver is controlled by the RF controller 106 of FIG. 1. An N-way divider and an N-way combiner include a single N-way bidirectional combiner/divider 823 allowing the bidirectional signaling. In FIG. 8, functions of an I/Q D-mixer 804-1, an I/Q U-mixer 804-2, a QSG 810, and other elements are the same as the functions of FIG. 1.

Figure 9:
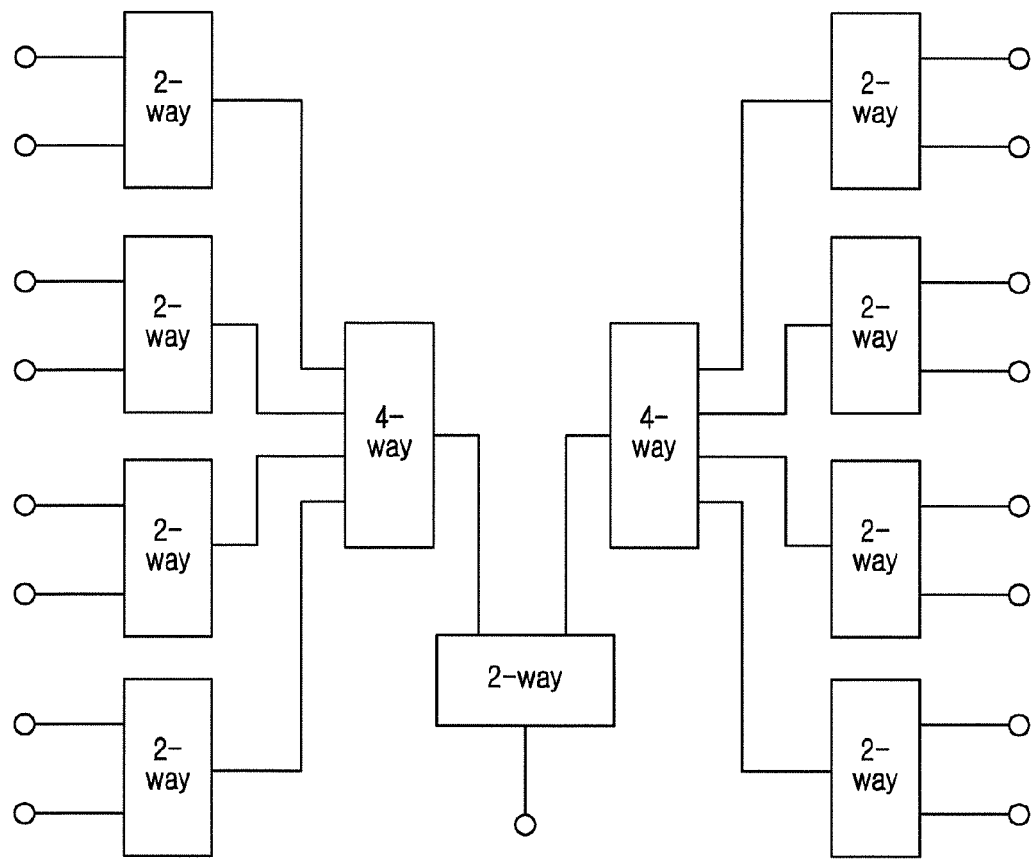
FIG. 9 illustrates an example N-way combiner or an example N-way divider according to this disclosure.
Figure 10:
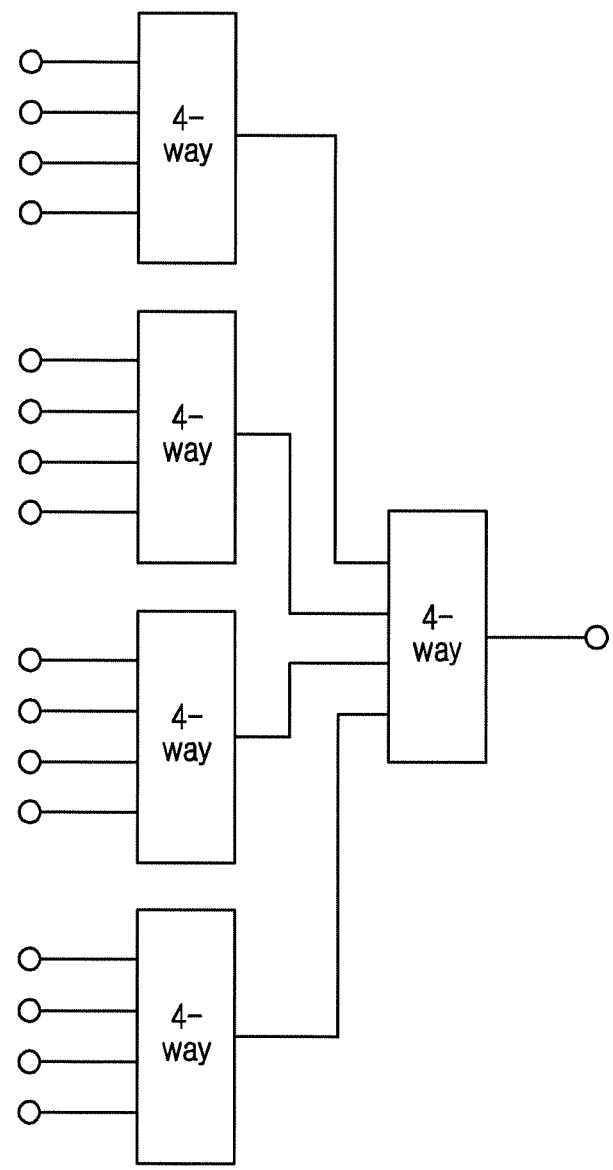
FIG. 10 illustrates an example N-way combiner or an example N-way divider according to this disclosure.

FIG. 9 depicts an example N-way combiner or an example N-way divider according to this disclosure. Referring to FIG. 9, 16 chains include eight 2-way combiners/dividers, two 4-way combiners/dividers, and one 2-way combiner/divider in order. FIG. 10 depicts an example N-way combiner or an example N-way divider according to this disclosure. Referring to FIG. 10, 16 chains include four 4-way combiners/dividers and one 4-way combiner/divider in order.

Figure 11:
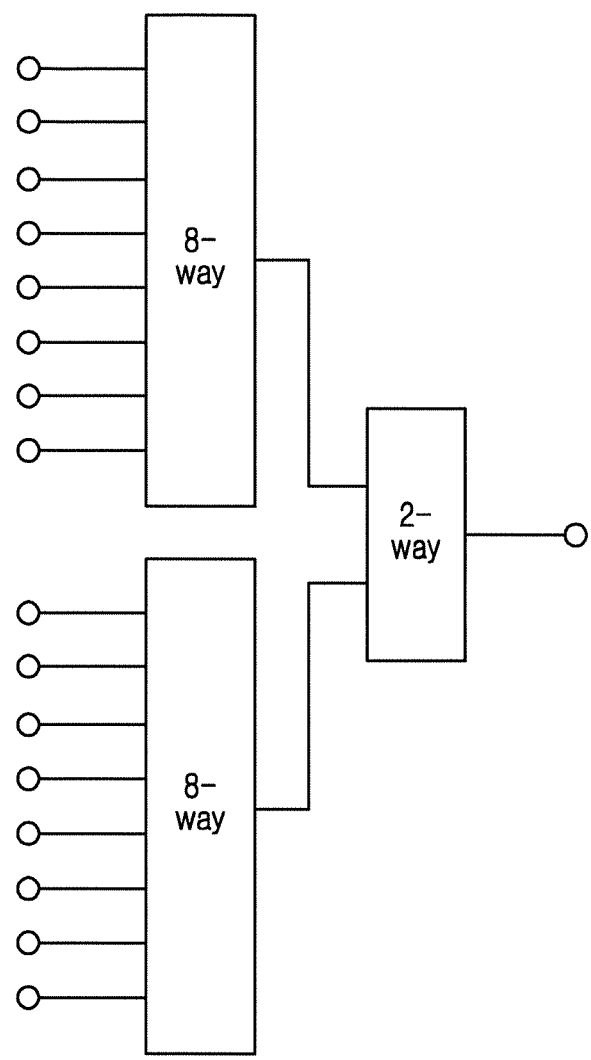
FIG. 11 illustrates an example N-way combiner or an example N-way divider according to this disclosure.
Figure 12:
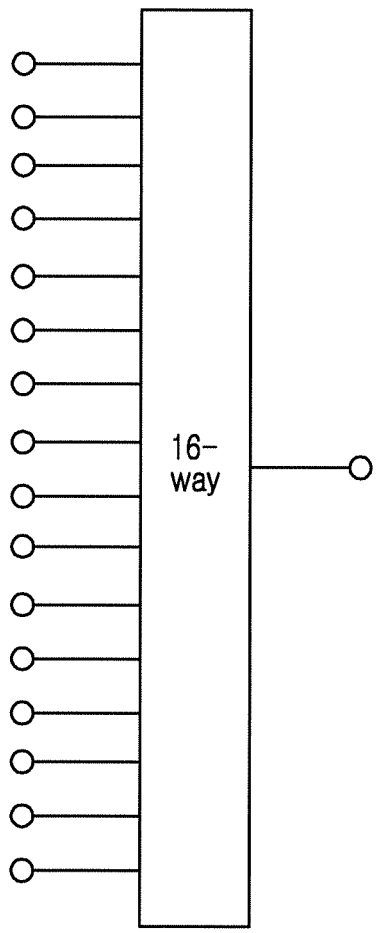
FIG. 12 illustrates an example N-way combiner or an example N-way divider according to this disclosure.

FIG. 11 depicts an example N-way combiner or an example N-way divider according to this disclosure. Referring to FIG. 11, 16 chains include two 8-way combiners/dividers and one 2-way combiner/divider in order. FIG. 12 depicts an example N-way combiner or an example N-way divider according to this disclosure. Referring to FIG. 12, 16 chains include one 16-way combiner/divider.

Figure 13A:
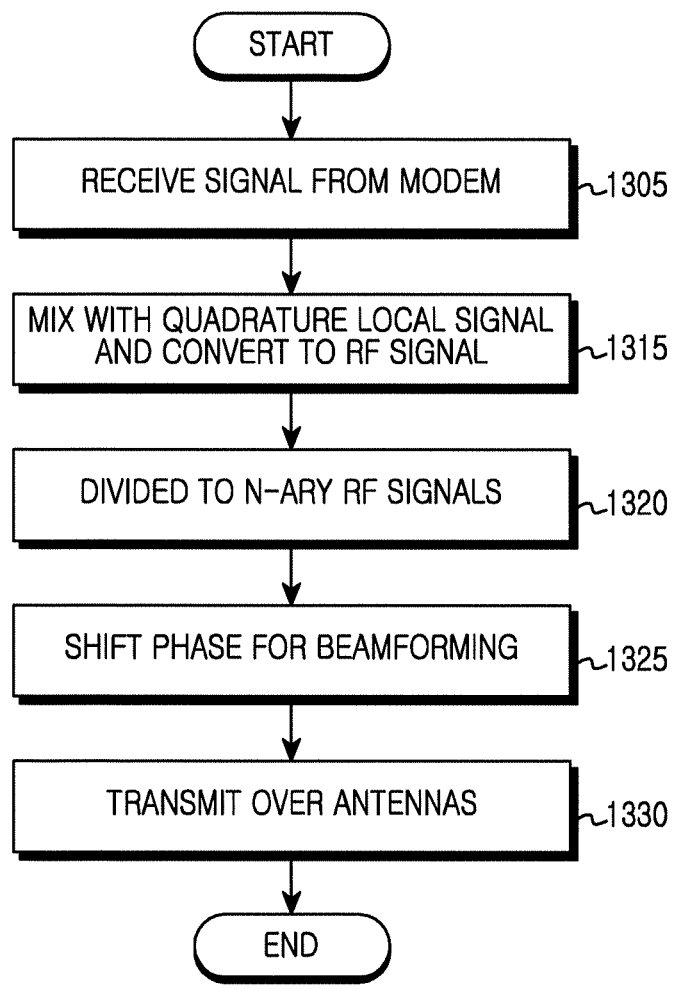
FIGS. 13A and 13B illustrates example operations of an RF transceiver according to this disclosure.
Figure 13B:
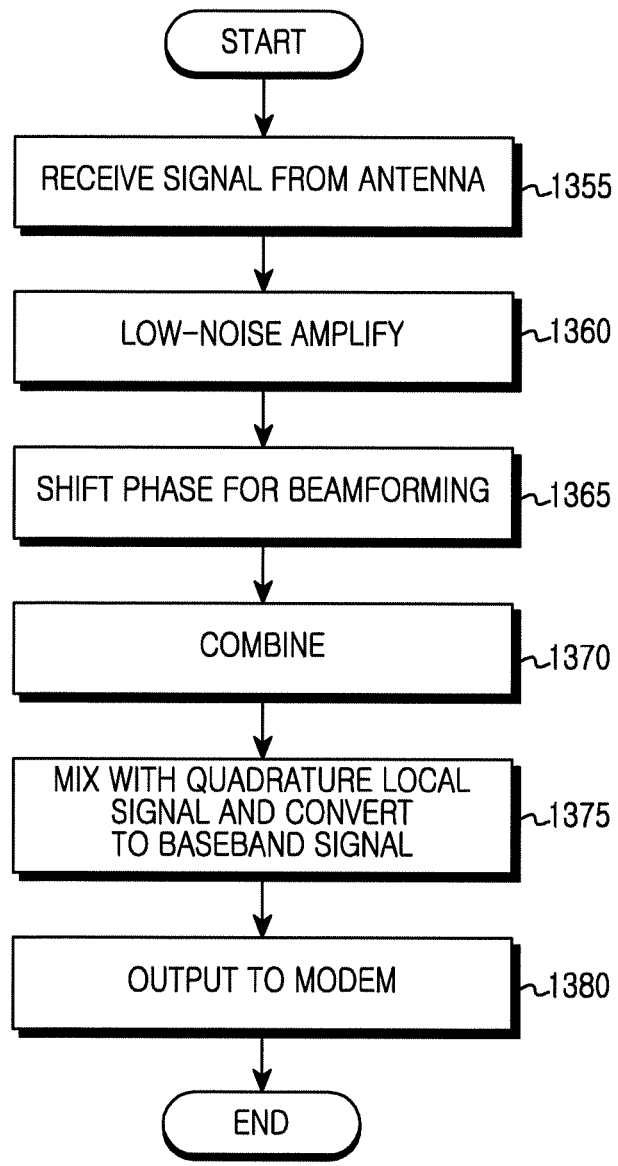

FIGS. 13A and 13B are flowcharts of example operations of the RF transceiver according to this disclosure. Referring to FIG. 13A, the transmission method is explained. The I/Q U-mixer receives the signal from the modem in step 1305. In step 1315, the I/Q U-mixer up-mixes the quadrature local signal output from the QSG and the received signal to the RF signal. In step 1320, the N-way divider divides the RF signal from the UQ U-mixer to N-ary RF signals of the same phase. Next, the P/S shifts the phase of the N-ary RF signals divided by the N-ary divider for the beamforming in step 1325 and transmits the signals over the antenna in step 1330. Herein, the phase shifting for the beamforming and the transmission and reception mode change is performed by the RF controller.

Referring to FIG. 13B, the reception method is described. The beamforming RF receiver receives the signals from the antennas in step 1355. In step 1360, the LNA low-noise amplifies the received RF signals. In step 1365, the PS shifts the phase of the RF signals amplified by the LNA, for the beamforming. In step 1370, the N-way combiner combines the phase-shifted RF signals. Next, the I/Q D-mixer mixes the combined RF signal and the QSG output signal to the baseband signal in step 1375 and outputs the baseband signal to the modem in step 1380.

Figure 14:
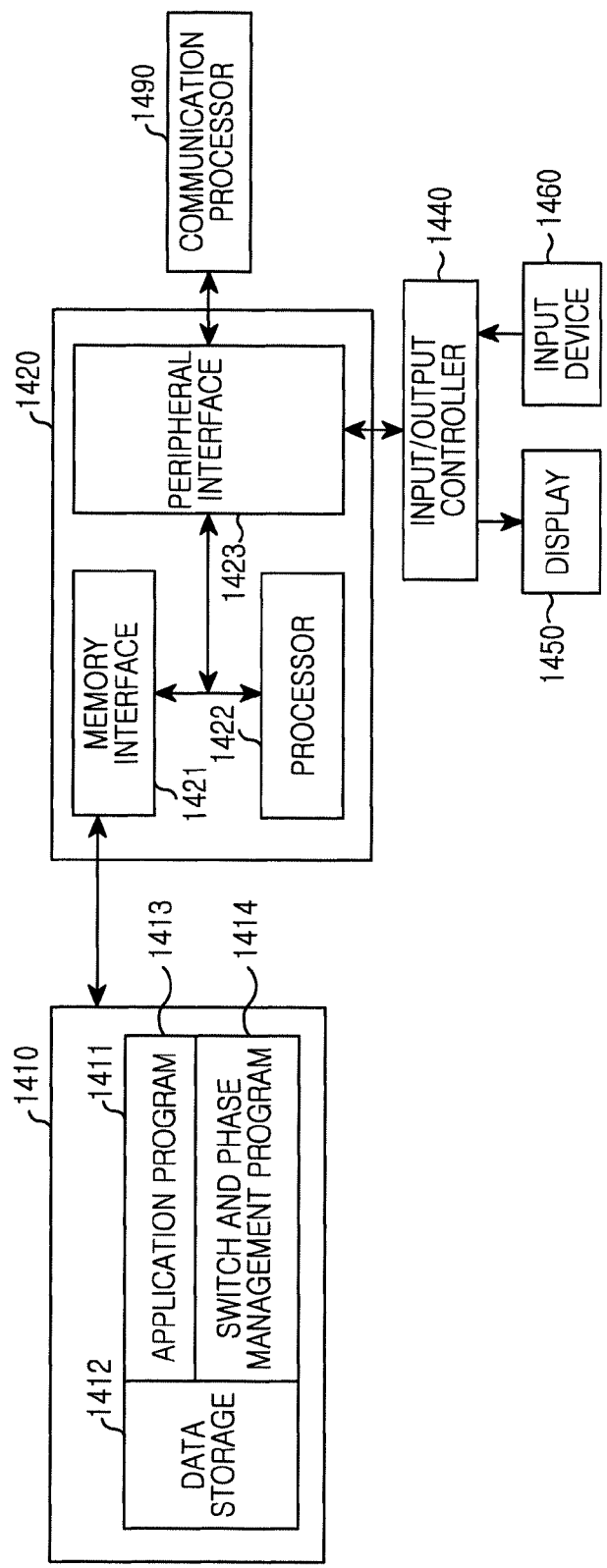
FIG. 14 illustrates an example electronic device including an RF transceiver according to this disclosure.

FIG. 14 is a block diagram of an example electronic device according to this disclosure. Referring to FIG. 14, the electronic device includes a memory 1410, a processor unit 1420, an input/output controller 1440, a display 1450, and an input device 1460. Herein, a plurality of memories 1410 is included. The components are explained in detail. The memory 1410 includes a program storage 1411 for storing a program to control the operations of the electronic device, and a data storage 1412 for storing data generating in the program execution. The data storage 1412 stores data required to operate an application program 1413 and a switch and phase management program 1414. The program storage 1411 includes the application program 1413 and the switch and phase management program 1414. Herein, the program in the program storage 1411 is referred to as an instruction set which is a set of instructions.

The application program 1413 includes an application program running on the electronic device. That is, the application program 1413 includes instructions of the application run by the processor 1422. The phase management program 1414 controls the P/S and the switch. That is, the phase management program 1414 determines the phase to shift for the beamforming and sends the phase information to the main controller of the modem. The phase management program 1414 determines whether the electronic device operates in the transmission mode or the reception mode, and sends the mode information to the main controller of the modem. The memory interface 1421 controls the access of the processor 1422 or a peripheral interface 1423 to the memory 1410.

The peripheral interface 1423 controls connections between an input/output peripheral, and the processor 1422 and the memory interface 1421. The processor 1422 controls to provide the corresponding service using at least one software program. The processor 1422 executes at least one program stored in the memory 1410 and provides the service corresponding to the program. The input/output controller 1440 provides an interface between the input/output device such as display 1450 and input device 1460, and the peripheral interface 1423. The display 1450 displays status information, an input character, a moving picture, and a still picture. For example, the display 1450 displays application program information of the processor 1422.

The input device 1460 provides input data generated by selection of the electronic device to the processor unit 1420 through the input/output controller 1440. The input device 1460 includes a keypad including at least one hardware button and a touch pad for detecting touch information. For example, the input device 1460 provides touch information such as touch, touch movement, and touch release detected by the touch pad, to the processor 1422 through the input/output controller 1440. The electronic device includes a communication processor 1490 for voice communication and data communication. The communication processor 1490 includes the beamforming transceiver 100 and the modem 107 of FIG. 1.

As set forth above, compared to the heterodyne structure requiring the IF stage, the present disclosure reduces the size and the power consumption. The present disclosure decreases the chip size by virtue of the transceiver which combines the transmitter and the receiver. Further, the same transmitting and receiving antenna reduces the antenna size and the RF package size. While the disclosure has been shown and described with reference to certain exemplary embodiments thereof, it will be understood by those skilled in the art that various changes in form and details is made therein without departing from the spirit and scope of the disclosure as defined by the appended claims and their equivalents.

What is claimed is:

1. A receiver comprising:
a plurality of switches connected to a plurality of antennas and configured to connect the plurality of antennas to a plurality of reception paths;
a plurality of Phase Shifters (P/Ss) configured to shift a phase of each of a plurality of Radio Frequency (RF) signals received via the plurality of reception paths;
a combiner configured to combine the plurality of phase-shifted RF signals to one RF signal;
a quadrature signal generator configured to generate differential I/Q (inphase and quadrature) signals for converting the combined RF signal to a baseband signal; and
a down-mixer configured to:
convert the combined RF signal to the baseband signal using the differential I/Q signals, and
output the baseband signal to a modem.

2. The receiver of claim 1, wherein the quadrature signal generator comprises:
a synthesizer configured to generate a local signal having a frequency $f_{LO}/M$;
a frequency multiplier configured to multiply the frequency $f_{LO}/M$ of the local signal by a value M, wherein the value M is a natural number;
a 4-way divider configured to divide the local signal having a frequency $f_{LO}$ into four local signals;
a first High Pass Filter (HPF) and a first Low Pass Filter (LPF) each configured to generate a phase difference of 90 degrees between a first local signal and a second local signal;
a first set of amplifiers configured to convert the first local signal and the second local signal each having a phase difference of 90 degrees to a first set of differential signals;
a second HPF and a second LPF each configured to generate a phase difference of 90 degrees between a third local signal and a fourth local signal; and
a second set of amplifiers configured to convert the third local signal and the fourth local signal each having a phase difference of 90 degrees to a second set of differential signals.

3. The receiver of claim 1, wherein the quadrature signal generator comprises:
a synthesizer configured to generate a local signal having a frequency $(M*f_{LO})$;
a frequency divider configured to divide the frequency $(M*f_{LO})$ of the local signal by value M, wherein the value M is a natural number;
a 4-way divider configured to divide the local signal having a frequency $f_{LO}$ into four local signals;

a first High Pass Filter (HPF) and a first Low Pass Filter (LPF) each configured to generate a phase difference of 90 degrees between a first local signal and a second local signal;

a first set of amplifiers configured to convert the first local signal and the second local signal each having a phase difference of 90 degrees to a first set of differential signals;

a second HPF and a second LPF each configured to generate a phase difference of 90 degrees between a third local signal and a fourth local signal; and a second set of amplifiers configured to convert the third local signal and the fourth local signal each having a phase difference of 90 degrees to a second set of differential signals.

4. The receiver of claim 1, wherein the combiner is formed by a combination of at least one N-way combiner, and wherein N is a natural number greater than 2.

5. A method implemented by receiver, the method comprising:
connecting, at a plurality of switches, a plurality of antennas to a plurality of reception paths, when receiving a plurality of Radio Frequency (RF) signals from the plurality of antennas;
shifting, at a first set of Phase Shifters (P/Ss), a phase of each of the plurality of RF signals received via the plurality of reception paths;
combining, at a combiner, the plurality of phase-shifted RF signals to one RF signal;
generating, at a quadrature signal generator, differential I/O (inphase and quadrature) signals for converting the combined RF signal to a baseband signal;
converting, at a down mixer, the combined RF signals the baseband signal; and
outputting the baseband signal to a modem.

6. The method of claim 5, wherein generating differential I/Q signals comprises:
generating a local signal having a frequency $f_{LO}/M$;
multiplying the frequency $f_{LO}/M$ of the local signal by an M value, wherein the M value is a natural number;
dividing the local signal having a frequency $f_{LO}$ into four local signals;
generating a phase difference of 90 degrees between a first local signal and a second local signal;
converting the first local signal and the second local signal each having a phase difference of 90 degrees to a first set of differential signals;
generating a phase difference of 90 degrees between a third local signal and a fourth local signal; and
converting the third local signal and the fourth local signal each having a phase difference of 90 degrees to a second set of differential signals a signal generator for generating the quadrature signal.

7. The method of claim 5, wherein generating differential I/Q signals comprises:
generating a local signal having a frequency $(M^*f_{LO})$;
dividing the frequency $(M^*f_{LO})$ of the local signal by an M value, wherein the M value is a natural number;
dividing the local signal having a frequency $f_{LO}$ into four local signals;
generating a phase difference of 90 degrees between a first local signal and a second local signal;
converting the local signal and the second local signal each having a phase difference of 90 degrees to a first set of differential signals;
generating a phase difference of 90 degrees between a third local signal and a fourth local signal; and converting the third local signal and the fourth local signal each having a phase difference of 90 degrees to a second set of differential signals.

8. The receiver of claim 1, wherein the receiver further comprises:
a plurality of Low Noise Amplifiers (LNAs) configured to connect between the plurality of switches and the plurality of first P/Ss.

9. The method of claim 5, further comprises:
before shifting a phase of each of the plurality of RF signals received via the plurality of reception paths, low-noise amplifying, at a plurality of Low Noise Amplifiers (LNAs), the plurality of RF signals.

10. A transmitter comprising:
a quadrature signal generator configured to generate differential I/Q (inphase and quadrature) signals for converting a baseband signal received from a modem to an RF signal;
an up-mixer configured to convert the baseband signal to the RF signal using the differential I/Q signals;
a divider configured to divide the RF signal into a plurality of RF signals;
a plurality of Phase Shifters (P/Ss) configured to shift a phase of each of the plurality of RF signals; and
a plurality of switches connected to a plurality of antennas and configured to transmit the plurality of phase-shifted RF signals to the plurality of antennas.

11. The transmitter of claim 10, wherein the quadrature signal generator comprises:
a synthesizer configured to generate a local signal having a frequency $f_{LO}/M$;
a frequency multiplier configured to multiply the frequency $f_{LO}/M$ of the local signal by an M value, wherein the M value is a natural number;
a 4-way divider configured to divide the local signal having a frequency $f_{LO}$ into four local signals;
a first High Pass Filter (HPF) and a first Low Pass Filter (LPF) configured to generate a phase difference of 90 degrees between a first local signal and a second local signal;
a first set of amplifiers configured to convert the first local signal and the second local signal having a phase difference of 90 degrees to a first set of differential signals;
a second High Pass Filter (HPF) and a second Low Pass Filter (LPF) configured to generate a phase difference of 90 degrees between a third local signal and a fourth local signal; and
a second set of amplifiers configured to convert the third local signal and the fourth local signal having a phase difference of 90 degrees to a second set of differential signals.

12. The transmitter of claim 10, wherein the quadrature signal generator comprises:
a synthesizer configured to generate a local signal having a frequency $(M^*f_{LO})$;
a frequency divider configured to divide the frequency $(M^*f_{LO})$ of the local signal by an M value, wherein the M value is a natural number;
a 4-way divider configured to divide the local signal having a frequency $f_{LO}$ into four local signals;
a first High Pass Filter (HPF) and a first Low Pass Filter (LPF) configured to generate a phase difference of 90 degrees between a first local signal and a second local signal;
a first set of amplifiers configured to convert the first local signal and the second local signal having a phase difference of 90 degrees to a first set of differential signals;

a second High Pass Filter (HPF) and a second Low Pass Filter (LPF) configured to generate a phase difference of 90 degrees between a third local signal and a fourth local signal; and a second set of amplifiers configured to convert the third local signal and the fourth local signal having a phase difference of 90 degrees to a second set of differential signals.

13. The transmitter of claim 10, wherein the quadrature signal generator comprises:

a local oscillator configured to generate a local signal having a frequency $f_{LO}$;

a 4-way divider configured to divide the local signal into four local signals;

a first High Pass Filter (HPF) and a first Low Pass Filter (LPF) configured to generate a phase difference of 90 degrees between a first local signal and a second local signal;

a first set of amplifiers configured to convert the first local signal and the second local signal having a phase difference of 90 degrees to a first set of differential signals;

a second High Pass Filter (HPF) and a second Low Pass Filter (LPF) configured to generate a phase difference of 90 degrees between a third local signal and a fourth local signal; and a second set of amplifiers configured to convert the third local and the fourth local signal having a phase difference of 90 degrees to a second set of differential signals.

14. The transmitter of claim 10, wherein the transmitter further comprises:

a plurality of Power Amplifiers (PAs) configured to amplify the plurality of phase-shifted RF signals.

15. A method implemented using a transmitter, the method comprising:

generating, at a quadrature signal generator, differential I/Q (inphase and quadrature) signals for converting a baseband signal received from a modem to an RF signal;

converting, at an up-mixer, the baseband signal to the RF signal using the differential I/Q signals;

dividing, at a divider, the RF signal into a plurality of RF signals;

shifting, at a plurality of Phase Shifters (P/Ss), a phase of each of the plurality of RF signals; and transmitting, at a plurality of switches connected to a plurality of antennas, the plurality of phase-shifted RF signals to the plurality of antennas.

16. The method of claim 15, wherein generating the differential I/Q signals comprises:

generating a local signal having a frequency $f_{LO}/M$;

multiplying the frequency $f_{LO}/M$ of the local signal by an M value, wherein the M value is a natural number;

dividing the local signal having a frequency $f_{LO}$ into four local signals;

generating a phase difference of 90 degrees between a first local signal and a second local signal;

converting the first local signal and the second local signal having a phase difference of 90 degrees to a first set of differential signals;

generating a phase difference of 90 degrees between a third local signal and a fourth local signal; and converting the third local signal and the fourth local signal having a phase difference of 90 degrees to a second set of differential signals.

17. The method of claim 15, wherein generating the differential I/Q signals comprises:

generating a local signal at a frequency $(M*f_{LO})$;

dividing the frequency $(M*f_{LO})$ of the local signal by an M value, wherein the M value is a natural number;

dividing the local signal having a frequency $f_{LO}$ into four local signals;

generating a phase difference of 90 degrees between a first local signal and a second local signal;

converting the first local signal and the second local signal having a phase difference of 90 degrees to a first set of differential signals;

generating a phase difference of 90 degrees between a third local signal and a fourth local signal; and converting the third local signal and the fourth local signal having a phase difference of 90 degrees to a second set of differential signals.

18. The method of claim 15, wherein generating the differential I/Q signals comprises:

generate a local signal having a frequency $f_{LO}$;

dividing the local signal having a frequency $f_{LO}$ into four local signals;

generating a phase difference of 90 degrees between a first local signal and a second local signal;

converting the first local signal and the second local signal having a phase difference of 90 degrees to a first set of differential signals;

generating a phase difference of 90 degrees between a third local signal and a fourth local signal; and converting the third local signal and the fourth local signal having a phase difference of 90 degrees to a second set of differential signals.

19. The method of claim 15, wherein the method further comprises:

amplifying, at a plurality of Power Amplifiers (PAs), the plurality of phase-shifted RF signals.

20. The receiver of claim 1, wherein the quadrature signal generator comprises:

a local oscillator configured to generate a local signal having a frequency $f_{LO}$;

a 4-way divider configured to divide the local signal into four local signals;

a first High Pass Filter (HPF) and a first Low Pass Filter (LPF) each configured to generate a phase difference of 90 degrees between a first local signal and a second local signal;

a first set of amplifiers configured to convert the first local signal and the second local signal each having a phase difference of 90 degrees to a first set of differential signals;

a second HPF and a second LPF each configured to generate a phase difference of 90 degrees between a third local signal and a fourth local signal; and a second set of amplifiers configured to convert the third local signal and the fourth local signal each having a phase difference of 90 degrees to a second set of differential signals.

21. The method of claim 5, wherein generating differential I/Q signals comprises:

generating a local signal having a frequency $f_{LO}$;

dividing the local signal having the frequency $f_{LO}$ into four local signals;

generating a phase difference of 90 degrees between a first local signal and a second local signal;

converting the first local signal and the second local signal each having a phase difference of 90 degrees to a first set of differential signals;

generating a phase difference of 90 degrees between a third local signal and a fourth local signal; and converting the third local signal and the fourth local signal each having a phase difference of 90 degrees to a second set of differential signals.

\* \* \* \* \*